US010523786B2

(12) United States Patent
Kenchammana-Hosekote et al.

(10) Patent No.: US 10,523,786 B2
(45) Date of Patent: *Dec. 31, 2019

(54) I/O BANDWIDTH REDUCTION USING STORAGE-LEVEL COMMON PAGE INFORMATION

(71) Applicant: NetApp Inc., Sunnyvale, CA (US)

(72) Inventors: Deepak Raghu Kenchammana-Hosekote, Sunnyvale, CA (US); Michael R. Eisler, Sunnyvale, CA (US); Arthur F. Lent, Sunnyvale, CA (US); Rahul Iyer, Sunnyvale, CA (US); Shravan Gaonkar, Sunnyvale, CA (US)

(73) Assignee: NetApp Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/016,455

(22) Filed: Jun. 22, 2018

(65) Prior Publication Data

US 2018/0309852 A1    Oct. 25, 2018

Related U.S. Application Data

(63) Continuation of application No. 15/073,006, filed on Mar. 17, 2016, now Pat. No. 10,021,218, which is a (Continued)

(51) Int. Cl.
*H04L 29/06* (2006.01)
*G06F 3/06* (2006.01)
(Continued)

(52) U.S. Cl.
CPC ............... *H04L 67/42* (2013.01); *G06F 3/06* (2013.01); *G06F 12/0866* (2013.01);
(Continued)

(58) Field of Classification Search
None
See application file for complete search history.

(56) References Cited

U.S. PATENT DOCUMENTS 6,112,285 A    8/2000  Ganapathy et al.
6,895,431 B1   5/2005  Bero
(Continued)

OTHER PUBLICATIONS

Bairavasundaram L.N., et al., "X-ray: A Non-invasive Exclusive Caching Mechanism for RAIDS," ACM SIGARCH Computer Architecture News, Mar. 2004, vol. 32 (2), pp. 176-187.
(Continued)

*Primary Examiner* — Scott B Christensen
(74) *Attorney, Agent, or Firm* — Cooper Legal Group, LLC

(57) ABSTRACT

I/O bandwidth reduction using storage-level common page information is implemented by a storage server, in response to receiving a request from a client for a page stored at a first virtual address, determining that the first virtual address maps to a page that is a duplicate of a page stored at a second virtual address or that the first and second virtual addresses map to a deduplicated page within a storage system, and transmitting metadata to the client mapping the first virtual address to a second virtual address that also maps to the deduplicated page. For one embodiment, the metadata is transmitted in anticipation of a request for the redundant/ deduplicated page via the second virtual address. For an alternate embodiment, the metadata is sent in response to a determination that a page that maps to the second virtual address was previously sent to the client.

20 Claims, 7 Drawing Sheets

Related U.S. Application Data continuation of application No. 12/771,934, filed on Apr. 30, 2010, now Pat. No. 9,323,689.

(51) Int. Cl.

| | | |
|---|---|---|
| *G06F 12/0866* | (2016.01) | |
| *G06F 12/10* | (2016.01) | |
| *H04L 29/08* | (2006.01) | |
| *G06F 12/02* | (2006.01) | |

(52) U.S. Cl.
CPC .......... *G06F 12/10* (2013.01); *H04L 67/1097* (2013.01); *G06F 12/0284* (2013.01); *G06F 2212/656* (2013.01)

(56) References Cited

U.S. PATENT DOCUMENTS

| | | | |
|---|---|---|---|
| 7,467,194 | B1 | 12/2008 | Slaughter et al. |
| 7,555,527 | B1 | 6/2009 | Slaughter et al. |
| 7,587,398 | B1 | 9/2009 | Fredricksen et al. |
| 7,739,236 | B2 | 6/2010 | Haswell |
| 8,190,850 | B1 | 5/2012 | Davenport et al. |
| 8,209,506 | B2 | 6/2012 | Yueh |
| 9,189,419 | B2 | 11/2015 | Garthwaite et al. |
| 2003/0163567 | A1 | 8/2003 | McMorris et al. |
| 2003/0191818 | A1 | 10/2003 | Rankin et al. |
| 2005/0021841 | A1 | 1/2005 | Yoshimoto |
| 2009/0083610 | A1 | 3/2009 | Arai et al. |
| 2009/0144422 | A1 | 6/2009 | Chatley et al. |
| 2009/0157690 | A1 | 6/2009 | Haswell |
| 2010/0250858 | A1 | 9/2010 | Cremelie et al. |
| 2011/0113115 | A1 | 5/2011 | Chang et al. |
| 2011/0138149 | A1* | 6/2011 | Karlsson ............. G06F 12/1027 711/207 |
| 2011/0191522 | A1 | 8/2011 | Condict et al. |
| 2011/0271010 | A1 | 11/2011 | Kenchammana et al. |
| 2012/0017027 | A1 | 1/2012 | Baskakov et al. |

OTHER PUBLICATIONS

Eisler M., "Storage De-Duplication Awareness in NFS," draft-eisler-nfsv4-pnfs-dedupe-00.txt, NFSv4, Standards Track, NetApp, Oct. 27, 2008, 23 pages.

Non-Final Office Action cited in U.S. Appl. No. 12/771,934 dated May 17, 2013, 17 pgs.

Reply Non-Final Office Action cited in U.S. Appl. No. 12/771,934 dated Nov. 15, 2013 , 13 pgs.

Non-Final Office Action cited in U.S. Appl. No. 12/771,934 dated Aug. 22, 2014, 25 pgs.

Reply Non-Final Office Action cited in U.S. Appl. No. 12/771,934 dated Nov. 24, 2014, 27 pgs.

Final Office Action cited in U.S. Appl. No. 12/771,934 dated Feb. 23, 2015, 27 pgs.

Notice of Appeal cited in U.S. Appl. No. 12/771,934 dated May 22, 2015, 7 pgs.

Notice of Allowance cited in U.S. Appl. No. 12/771,934 dated Dec. 18, 2015, 27 pgs.

Amendment after Notice of Allowance cited in U.S. Appl. No. 12/771,934 dated Dec. 21, 2015, 11 pgs.

Preliminary Amendment cited in U.S. Appl. No. 15/073,006 dated Mar. 17, 2016, 11 pgs.

Non-Final Office Action cited in U.S. Appl. No. 15/073,006 dated Oct. 3, 2017, 26 pgs.

Reply Non-Final Office Action cited in U.S. Appl. No. 15/073,006 dated Jan. 3, 2018, 15 pgs.

Notice of Allowance cited in U.S. Appl. No. 15/073,006 dated Feb. 28, 2018, 21 pgs.

Amendment after Notice of Allowance cited in U.S. Appl. No. 15/073,006 dated May 24, 2018, 12 pgs.

\* cited by examiner

I/O BANDWIDTH REDUCTION USING STORAGE-LEVEL COMMON PAGE INFORMATION

This application claims priority to and is a continuation of U.S. application Ser. No. 15/073,006, filed on Mar. 17, 2016, now allowed, titled "I/O Bandwidth Reduction using Storage-Level Common Page Information," which claims priority to and is a continuation of U.S. Pat. No. 9,323,689, filed on Apr. 30, 2010, titled "I/O Bandwidth Reduction using Storage-Level Common Page Information," which are incorporated herein by reference.

FIELD OF THE INVENTION

At least one embodiment of the present invention pertains to data storage systems, and more particularly, to reducing input/output requests by using storage-level common page information.

BACKGROUND

Various forms of network-based storage systems exist today. These forms include network attached storage (NAS), storage area networks (SAN's), and others. Network-based storage systems are commonly used for a variety of purposes, such as providing multiple users with access to shared data, backing up critical data (e.g., by data mirroring), etc.

A network-based storage system typically includes at least one storage server, which is a processing system configured to store and retrieve data on behalf of one or more client processing systems (clients). In the context of NAS, a storage server may be a file server, which is sometimes called a "filer". A filer operates on behalf of one or more clients to store and manage shared files. The files may be stored in a storage system that includes one or more arrays of mass storage devices, such as magnetic or optical disks or tapes, by using a data storage scheme such as Redundant Array of Inexpensive Disks (RAID). Additionally, the mass storage devices in each array may be organized into one or more separate RAID groups. In a SAN context, a storage server provides clients with block-level access to stored data, rather than file-level access. Some storage servers are capable of providing clients with both file-level access and block-level access, such as certain storage servers made by NetApp, Inc. (NetApp®) of Sunnyvale, Calif.

Storage servers may implement a deduplication algorithm. Deduplication eliminates redundant copies of data that is stored within the data storage. Deduplication is accomplished in several ways, including hierarchical deduplication, in-line deduplication, and background deduplication. Hierarchical deduplication includes deriving one file from another, usually by one file starting off as copy of another, but zero or nearly zero bytes of data are actually copied or moved. Instead, the two files share common blocks of data storage. An example is a snapshot, where a snapshot is made of a file system, such that the snapshot and active file system are equal at the time snapshot is taken, and share the same data storage, and thus are effectively copies that involve zero or near zero movement of data. As the source file system changes, the number of shared blocks of data storage reduces. A variation of this is a writable snapshot (also referred to as a clone) which is taken of a file system. In this variation as the source and cloned file systems each change, there are fewer shared blocks. In-line deduplication includes a storage access protocol initiator (e.g. an NFS client) creating content via write operations, while the target of the storage access protocol checks if the content being written is duplicated somewhere else on the target's storage. If so, the data is not written. Instead, the logical content metadata, pointer, etc.) refers to the duplicate. Background deduplication includes a background task (e.g., on a storage access protocol target) scanning for duplicate blocks, freeing all but one of the duplicates, and mapping corresponding pointers (or other logical content) from the now free blocks to the remaining duplicate.

Additionally, clients nay implement a hypervisor software layer. A hypervisor software layer, also referred to as a virtual machine monitor, allows the client processing system to run multiple virtual machines (e.g., different operating systems, different instances of the same operating system, or other software implementations that appear as "different machines" within a single computer). Deduplication, in its various forms, is of particular interest when a client implements a hypervisor software layer because multiple virtual machines often use the same data (e.g., to run the same program) and the hypervisor software layer allows the virtual machines to utilize the single copy of the common page, file, or other unit of data. As a result, deduplication is able to reduce required storage capacity because primarily only the unique data is stored. For example, a system containing 100 virtual machines might contain 100 instances of the same one megabyte (MB) file. If all 100 instances are saved, approximately 100 MB storage space is used. With data deduplication, only one instance of the file is actually stored and each subsequent instance is just referenced back to the one saved copy. In this example, a 100 MB storage demand could be reduced to only 1 MB (for the data). Indexing of the data, however, is still retained. For example, a smaller amount of memory (when compared to storing multiple copies of the data) is used to store metadata for each instance.

Accordingly, in a network-based storage system, data that is managed by a storage server and shared by multiple clients (multiple client machines and/or virtual machines within one or more client machines) may benefit from deduplication. Due to the large amount of data managed and stored by a storage server, clients may be unaware data redundancies within the storage system and that may have been eliminated by deduplication. As a result, a client may send an input/output (I/O) request to the server to retrieve a page at a particular virtual address that contains data that is a duplicate of data already sent to and stored within the client. The client may not be aware that the requested page has been deduplicated by the server or that the client may be currently storing a redundant copy of the data because the redundant/deduplicated data is associated with a different virtual address. In response to such an I/O request, the server sends the redundant/deduplicated data to the client, consuming communication channel resources such as available bandwidth between the server and clients. The client may then store (e.g., in a cache) a copy of the redundant/deduplicated data, consuming storage resources within the client.

SUMMARY

Embodiments of I/O bandwidth reduction using storage-level common page information include, in response to receiving a request from a client for a page stored at a first virtual address, determining that the requested page that is a duplicate of a page stored at a second virtual address or that the first and second virtual addresses map to a deduplicated page within a storage system, and transmitting metadata to the client mapping the first virtual address to the second virtual address. For one embodiment, the metadata is transmitted in anticipation of a request for the redundant/deduplicated page via the second virtual address. For an alternate embodiment, the metadata is sent in response to a determination that a page that maps to the second virtual address was previously sent to the client.

Embodiments of the present invention are described in conjunction with systems, clients, servers, methods, and computer-readable media of varying scope. In addition to the aspects of the embodiments described in this summary, further aspects of embodiments of the invention will become apparent by reference to the drawings and by reading the detailed description that follows.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

Figure 1:
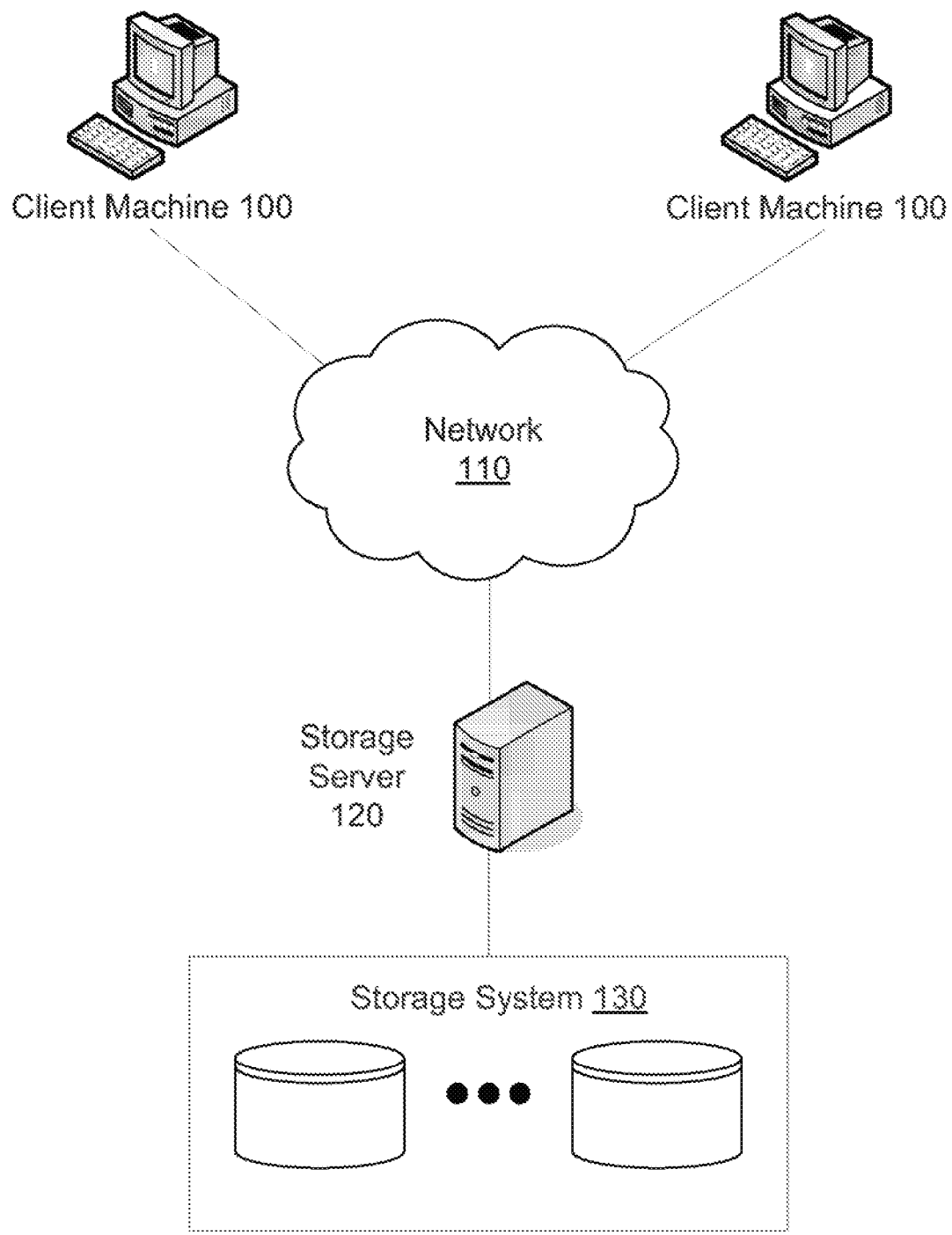
FIG. 1 illustrates a storage network environment, in which a I/O bandwidth reduction using storage-level common page information may be implemented.

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional, and other changes may be made without departing from the scope of the present invention. The following detailed description is, therefore, not to be taken in a limiting sense, and the scope of the present invention is defined only by the appended claims. References in this specification to "an embodiment," "one embodiment," or the like, mean that the particular feature, structure or characteristic being described is included in at least one embodiment of the present invention. However, occurrences of such phrases in this specification do not necessarily all refer to the same embodiment.

As used herein, a virtual address (also referred to as a virtual block number) is a logical reference to a memory location—e.g., an indirect reference to a physical memory location. In operating systems that use virtual memory, a process may utilize what appears to be large, contiguous sections of memory. While the virtual memory appears contiguous, the underlying physical memory utilized by the process may be dispersed across different areas of one or more physical storage devices. When a process requests access to memory, an operating system maps the virtual address provided by the process to the physical address where that memory is stored. Similarly, in a network-based storage system, when a client sends an input/output (I/O) request to a storage server, the request may include a virtual address and the storage server maps the virtual address to the corresponding physical address in the storage system.

As used herein, a page (also referred to as a memory page or virtual page) is a fixed-length block of storage, in the context of computer virtual memory. A page is typically the smallest unit of data of a memory allocation or I/O transfer—e.g. 4 kilobytes. Page size, however, may vary—e.g., operating systems often allow programs to determine page size at runtime.

As set forth in further detail below, I/O bandwidth reduction using storage-level common page information is implemented by a storage server, in response to receiving a request from a client for a page stored at a first virtual address, determining that the requested page of data within a storage system is a duplicate of a page stored at a second virtual address or a deduplicated page, wherein the second virtual address also maps to the deduplicated page, and transmitting metadata to the client mapping the first virtual address to a second virtual address. For one embodiment, the metadata is transmitted in anticipation of a request for the page via the second virtual address. For an alternate embodiment, the metadata is sent in response to a determination that a page that maps to the second virtual address was previously sent to the client. In transmitting metadata rather than the actual pages, the use of bandwidth between the client and server is reduced. Additionally, the client may use the metadata to avoid storing a duplicate copy of the same page/data. For one embodiment, the first and second virtual addresses map to a page of data that has been or will be deduplicated within the storage system.

FIG. 1 shows an exemplary network environment that incorporates one or more client machines 100 (clients) coupled to a network 110. Each of the clients 100, in which an embodiment of the I/O bandwidth reduction using storage-level common page information can be implemented, may be, for example, a conventional personal computer (PC), server-class computer, workstation, virtual machine, or the like. The clients 100 are coupled to the storage server 120 through a network 110. The network 110 may be, for example, a local area network (LAN), a wide area network (WAN), a global area network (GAN), etc., such as the Internet, a Fibre Channel fabric, or a combination of such networks. The clients 100 send I/O requests to a storage server 120.

For one embodiment, a client cache (illustrated and described with reference to FIG. 3) is utilized within the clients 100 to store frequently accessed data and minimize I/O requests sent to the storage server 120. For example, I/O requests directed to the storage server 120 may be the result of a cache miss within the client 100. For one embodiment, the client cache is implemented within a hypervisor/virtual machine environment. A hypervisor, also referred to as a virtual machine monitor, is a software layer that allows a processing system to run multiple virtual machines (e.g., different operating systems, different instances of the same operating system, or other software implementations that appear as "different machines" within a single computer). The hypervisor software layer resides between the virtual machines and the hardware and/or primary operating system of a machine and allows for the sharing of the underlying physical machine resources between different virtual machines. Accordingly, if the client cache is implemented within the hypervisor layer that controls the implementation of the various virtual machines, only a single instance of the cache is used for the multiple virtual machines and all virtual machines benefit from the collective caching of I/O requests.

The storage server 120, in which an embodiment of the I/O bandwidth reduction using storage-level common page information can be implemented, is described in further detail below with reference to FIG. 2. Although illustrated as a self-contained element, the storage server 120 may have a distributed architecture (e.g., multiple storage servers 120 cooperating or otherwise sharing the task of managing a storage system). In this way, all of the storage systems can form a single storage pool, to which any client of any of the storage servers has access.

The storage server 120 is further coupled to a storage system 130. The storage system 130 includes a set of mass storage devices. The mass storage devices in the storage system 130 may be, for example, conventional magnetic disks, solid-state disks (SSD), magneto-optical (MO) storage, or any other type of non-volatile storage devices suitable for storing large quantities of data. The storage server 120 manages the storage system 130, for example, by receiving and responding to various 110 requests from the client(s) 100, directed to data stored in or to be stored in the storage system 130. Although illustrated as separate components, for one embodiment, the storage server 120 and storage system 130 may be a part of/housed within a single device.

For one embodiment, storage system 130 is managed as a RAID array. RAID is a data storage scheme that divides and replicates data among multiple hard disk drives—e.g., in stripes of data. Data striping is the technique of segmenting logically sequential data, such as a single file, so that segments can be assigned to multiple physical devices/hard drives. Redundant (parity) data is stored to allow problems to be detected and possibly fixed. For example, if one were to configure a hardware-based RAID-5 volume using three 250 GB hard drives (two drives for data, and one for parity), the operating system would be presented with a single 500 GB volume and the exemplary single file may be stored across the two data drives.

When storage devices are organized as one or more parity groups in a RAID array, the data is stored as stripes of blocks within the parity groups, wherein a stripe may constitute similarly located pages across the storage devices. For example, a stripe may span a first page 0 on storage device 0, a second page 0 on storage device 1, etc. across the entire parity group with parity being distributed among the pages of the storage devices. For the sake of clarity, however, examples described herein will refer to physical addresses without reference to individual storage devices within storage system 130. Furthermore, other RAID group arrangements are possible, such as providing a RAID scheme wherein every predetermined (e.g., 8th) block in a file is a parity block. Embodiments of the invention, however, can be implemented in both RAID and non-RAID environments.

It will be appreciated that certain embodiments of the present invention may include solid-state memories, e.g., flash storage devices constituting storage system 130. For example, storage system 130 may be operative with non-volatile, solid-state NAND flash devices which are block-oriented devices having good random read performance, i.e., random read operations to flash devices are substantially faster than random write operations to flash devices. Data stored on a flash device is accessed (e.g., via I/O requests) in units of pages, which in the present embodiment are 4 kB in size, although other page sizes (e.g., 2 kB, 8 kB, etc.) may also be used.

Figure 2:
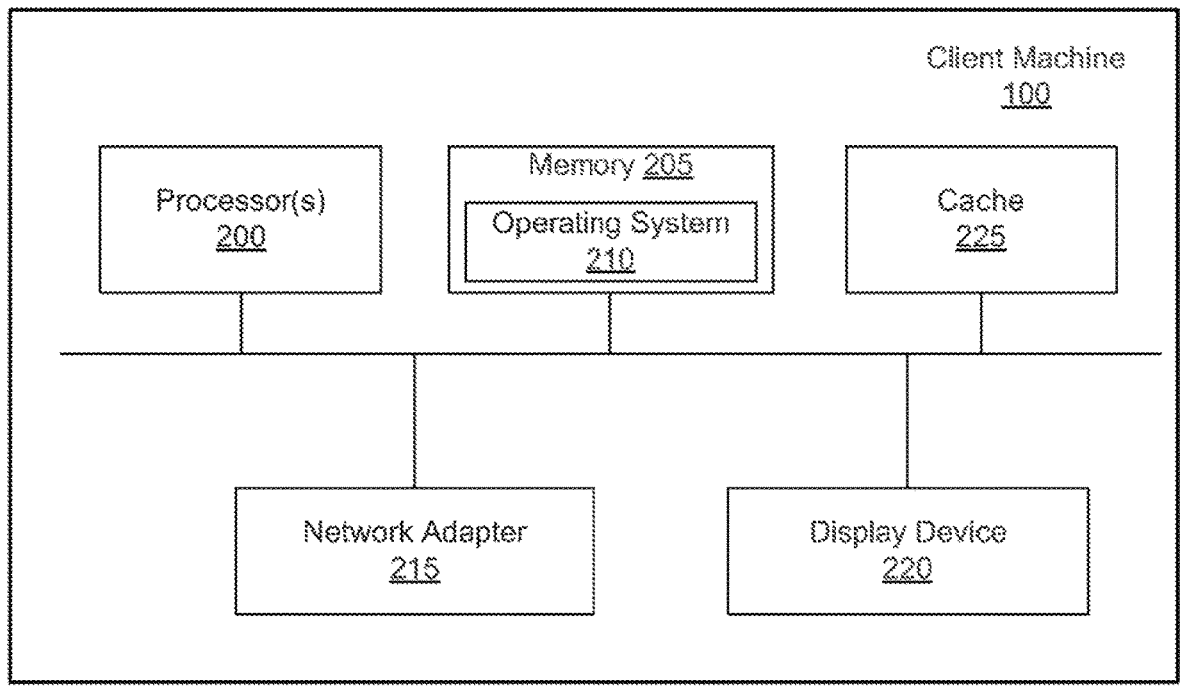
FIG. 2 shows an example of the hardware architecture of client machine in which I/O bandwidth reduction using storage-level common page information may be implemented.

FIG. 2 is a block diagram showing an example of the architecture of a client machine 100 at a high level. Certain standard and well-known components, which are not germane to the present invention, are not shown. The client 100 is organized as one or more processors 200, a memory 205, a network adapter 215, a display device 220, and a cache 225 coupled to a bus system. The bus system shown in FIG. 2 is an abstraction that represents any one or more separate physical buses and/or point-to-point connections, connected by appropriate bridges, adapters and/or controllers.

The processor(s) 200 are the central processing units (CPUs) of the storage server 120 and, thus, control its overall operation. The processor(s) 200 accomplish this by executing software stored in memory 205. The memory 205 includes the main memory of the client 100. The memory 205 stores, among other things, the client's operating system 210, which, according to one embodiment, includes instructions executed by processor(s) 200 to implement I/O bandwidth reduction using storage-level common block information as described herein.

Also connected to the processors 200 through the bus system is a network adapter 215 The network adapter 215 provides the client machine 100 with the ability to communicate with remote devices, such as the storage server 120, over a network.

Display device 220 presents data to a user visually and allows a user to interact with the data—e.g., via a mouse, keyboard, or other device (not shown).

The client 100 also includes a cache 225. For one embodiment, the cache 225 is implemented within random access memory (RAM) within the client 100. Alternatively, embodiments of cache 225 may include volatile and/or non-volatile memories. For one embodiment, the cache 225 stores recently received and/or frequently used pages of data provided by a storage server 120 in response to I/O requests. Prior to sending an I/O request to a storage server 120, the client 100 may first check the contents of its cache 225. If a copy of the page requested by the I/O is stored in the cache 225, the client 100 can avoid sending a redundant I/O request. Additionally, for one embodiment, the cache 225 stores metadata that indicates common block information between pages, as will be explained further with reference to FIGS. 4-6.

Figure 3:
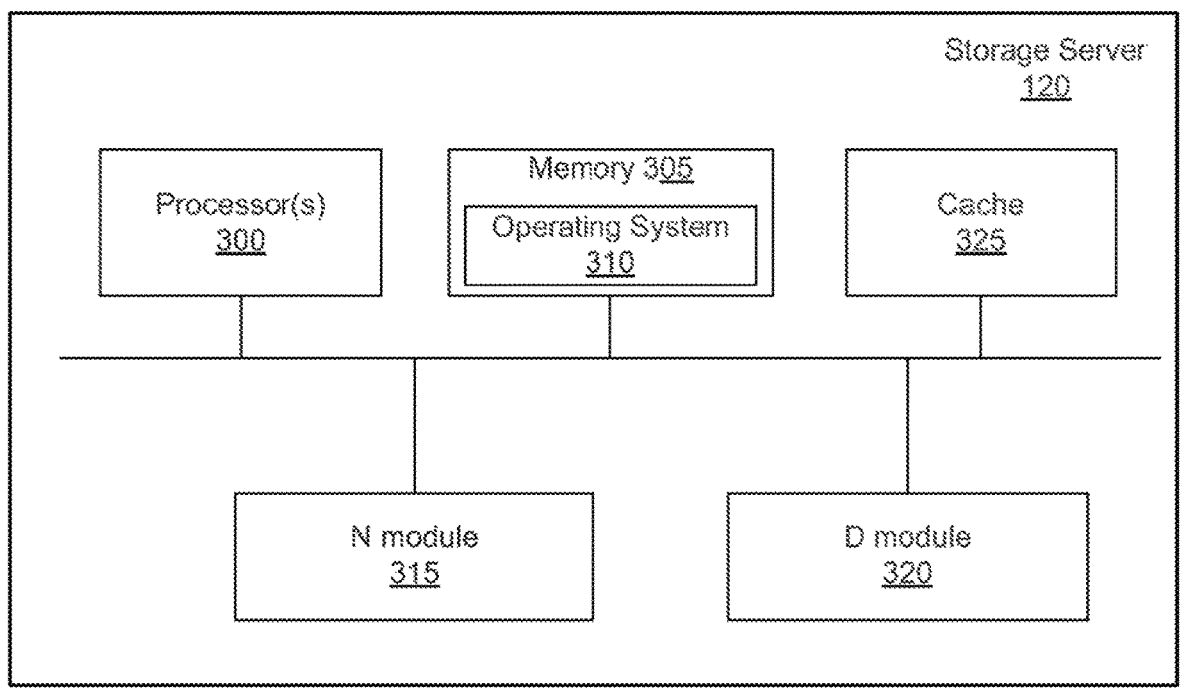
FIG. 3 shows an example of the hardware architecture of a storage server in which I/O bandwidth reduction using storage-level common page information may be implemented.

FIG. 3 is a block diagram showing an example of the architecture of a storage server 120 at a high level. Certain standard and well-known components, which are not germane to the present invention, are not shown. Although illustrated as a self-contained element, the storage server 120 may have a distributed architecture (e.g., multiple storage servers 120 or separate modules cooperating or otherwise sharing the task of managing a storage system).

For one embodiment, the storage server 120 is operative as multiple functional components that cooperate to provide the network-based storage system. To that end, the storage server 120 is organized as one or more processors 300, a memory 305, a network element or module (N-module) 315, a disk element or module (D-module) 320, and a cache 325 coupled to a bus system. The bus system shown in FIG. 3 is an abstraction that represents any one or more separate physical buses and/or point-to-point connections, connected by appropriate bridges, adapters and/or controllers.

The processor(s) 300 are the central processing units (CPUs) of the storage server 120 and, thus, control its overall operation. The processor(s) 300 accomplish this by executing software stored in memory 305. For one embodiment, individual modules (e.g., N-module 315 and D-module 320) each include a processor and memory for carrying out respective module operations.

The memory 305 includes the main memory of the storage server 120. The memory 305 stores, among other things, the storage server's operating system 310, which, according to one embodiment, includes instructions executed by processor(s) 300 to implement I/O bandwidth reduction using storage-level common block information as described herein.

The N-module 315 includes functionality that enables the storage server 120 to connect to clients 100 via network 110 and may include protocol components such as a Media Access Control (MAC) layer, Common Internet File System (CIFS), Network File System (NFS), Internet Protocol (IP) layer, Transport Control Protocol (TCP) layer, User Datagram Protocol (UDP) layer, and other protocols known in the art for facilitating such connectivity. In contrast, the D-module 320 may connect to one or more storage devices within storage system 130, e.g., via cluster switching fabric, and may be operative to service client I/O requests within the storage system 130. For one embodiment, the D-module 320 includes storage access components such as a storage abstraction layer supporting multi-protocol data access (e.g., Common Internet File System protocol, the Network File System protocol, and the Hypertext Transfer Protocol), a storage layer implementing storage protocols (e.g., RAID protocol), and a driver layer implementing storage device protocols (e.g., Small Computer Systems interface protocol) for carrying out operations in support of storage access operations. Illustratively, a storage abstraction layer (e.g., file system) of the D-module 320 divides the physical storage of storage system 130 into storage objects (e.g., pages, files, etc.). Requests received by the storage server 120 (e.g., via N-module 315) may thus include storage object identifiers, e.g., virtual addresses, to indicate a storage object on which to carry out the request. For one embodiment, the D-module 320 maps the virtual addresses to their corresponding physical addresses within storage system 130.

The storage server 120 also includes a cache 225. For one embodiment, the cache 225 is implemented within random access memory (RAM) within the storage server 120. Alternatively, embodiments of cache 225 may include volatile and/or non-volatile memories. For one embodiment, the storage server 120 maintains an address map within the cache 225 to map virtual addresses of redundant/deduplicated data. Logically, the address map is a set of two or more virtual addresses that all reference the same redundant/deduplicated data via a unique identifier. For one embodiment, virtual addresses that map to redundant data (i.e., a redundant page) are candidates for a deduplication operation that has yet to be completed. Alternatively, even if the storage server 120 does not implement deduplication, it still may maintain an address map of redundant data. The storage server 120 may use the address map in the cache 225 to determine that a first virtual address refers to redundant/deduplicated data within a storage system 130 that is also associated with a second virtual address, as will be described in further detail below with reference to FIGS. 4-8. For one embodiment, the storage server 120 maintains a map of redundant/deduplicated data for recently accessed pages. For example, the storage server 120 may maintain back-pointers from physical block numbers, or other unique identifiers, stored in its cache 325. When an I/O request for a virtual address is received, it is mapped to a unique identifier, which may point back to a list of all virtual addresses that map to that unique identifier. For an alternate embodiment, the storage server 120 maintains a map of redundant/deduplicated data for all pages within the storage system 130 instead of limiting the map to recently accessed pages.

It will be readily apparent that input/output devices, such as a keyboard, a pointing device, and a display, may be coupled to the storage server 120. These features have not been illustrated for the sake of clarity.

Figure 4:
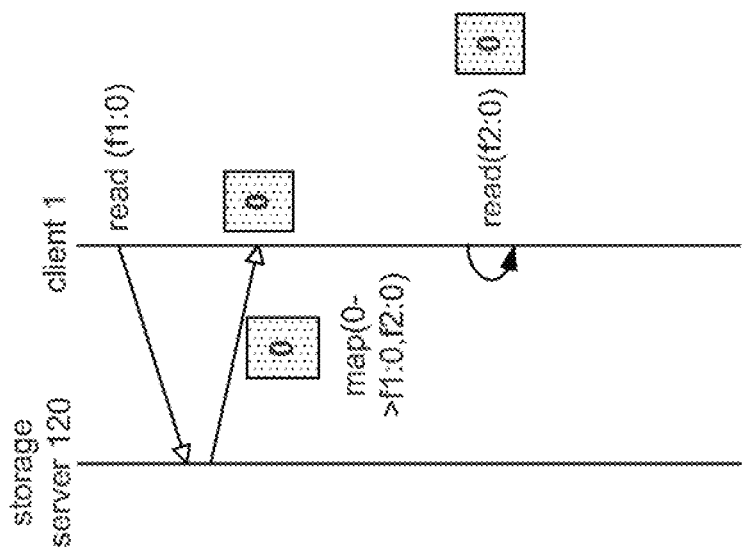
FIG. 4 shows an exemplary exchange between a client and a storage server implementing I/O bandwidth reduction using storage-level common page information.
Figure 4:
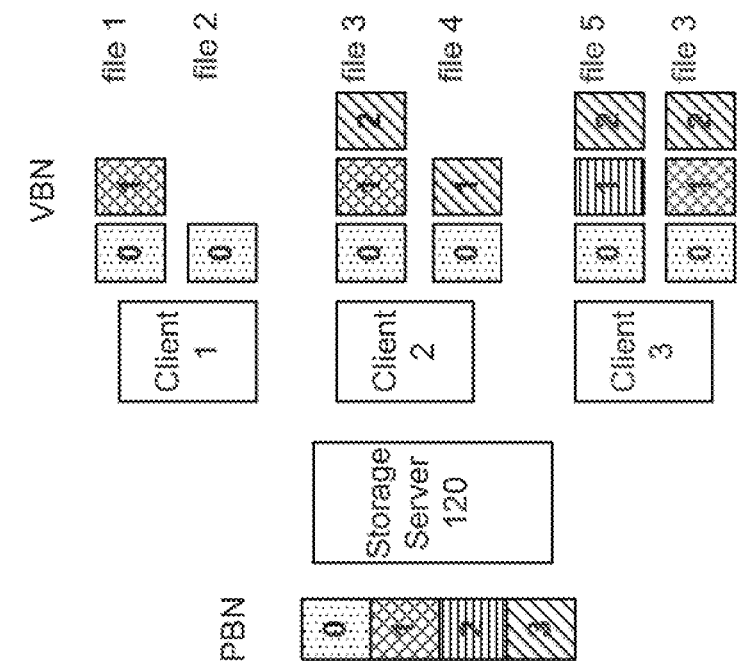

FIG. 4 shows an exemplary exchange between a client 100 and a storage server 120 implementing an embodiment of I/O bandwidth reduction using storage-level common page information. The storage server 120 manages pages of data at physical block numbers (PBN) 0, 1, 2, and 3 and maps them (shown by the shading patterns) to virtual block numbers (VBN) for various files associated with each of clients 1, 2, and 3. The storage server 120, of course, would have the capacity to store and manage much more data, but only four pages of data are illustrated for the sake of clarity. Clients 1, 2, and 3 are individual clients which may be client machines 100 or virtual machines within client machines 100 as described above with reference to FIGS. 1-3.

While a VBN and PBN may appear to use the same address (illustrated by the numbers 0-4), they may not map to one another. For example, for file 4, VBN's 0 and 1 map to PBN's 0 and 3, respectively. Additionally, FIG. 3 illustrates the storage of redundant/deduplicated data—e.g., files 1, 2, 3, 4, and 5 all contain a VBN 0 that maps to PBN 0 (illustrated by the use of the same shading pattern). Only one copy of the page, however, is stored and managed by the storage server 120 (e.g., PBN 0), as opposed to five separate copies of the same page.

The exchange between each of the client 1 and the storage server 120 will be described and further illustrated with reference to FIG. 6.

Figure 6:
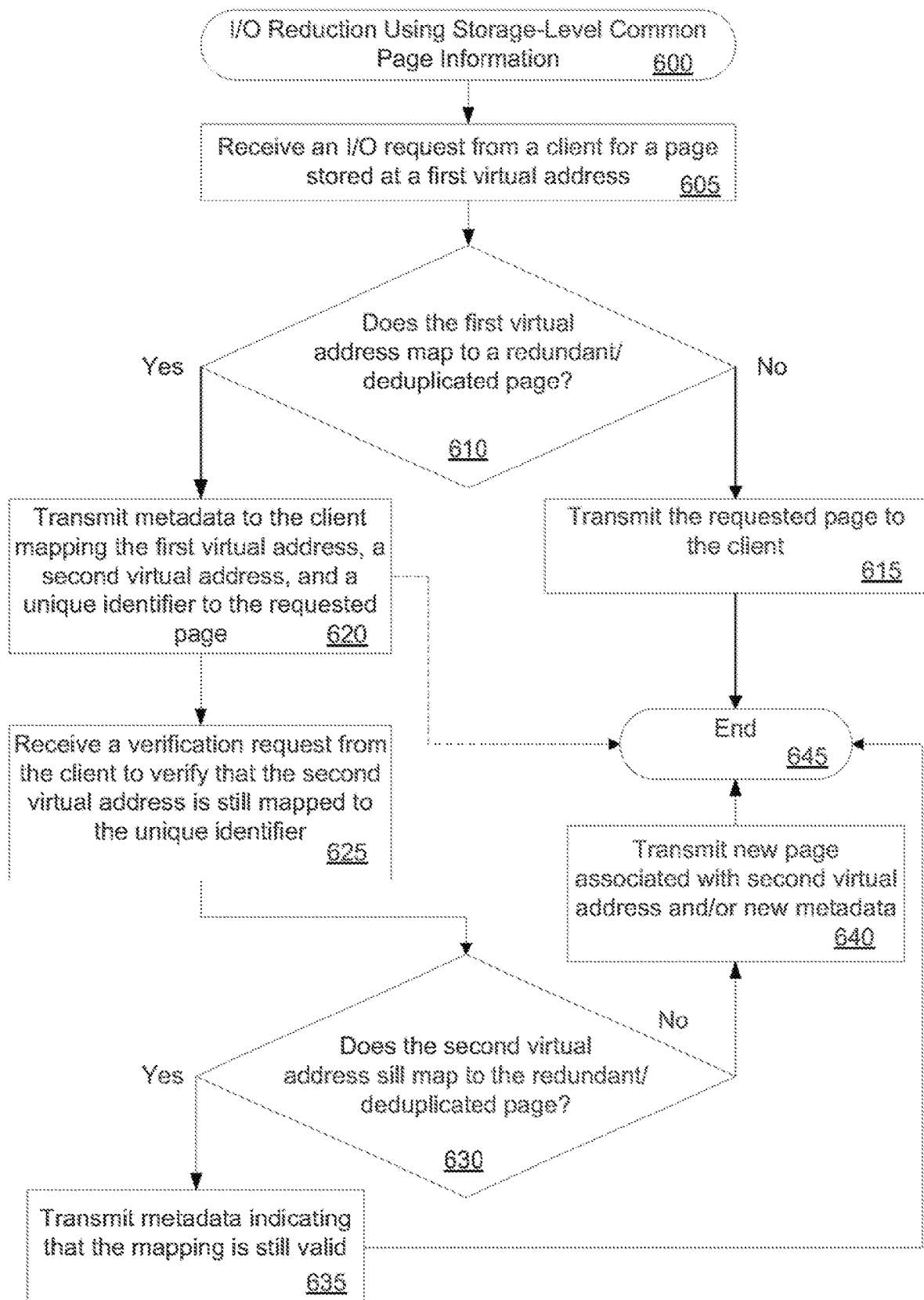
FIG. 6 shows an exemplary flow chart for a method of I/O bandwidth reduction using storage-level common page information.

In FIG. 6, at block 605, the storage server 120 receives an I/O request from a client 100 for a page stored at a first virtual address. For example, in FIG. 4, client 1 sends an I/O request for VBN 0 for file 1 (f1:0).

At block 610, the storage server 120 determines if the requested page at the first virtual address is a redundant/deduplicated page that also maps to a second virtual address—i.e., both the first and second virtual addresses store the same content or map to the same physical address. For example, the storage server 120 maintains a list, look up table, or other data structure mapping virtual addresses to redundant/deduplicated data—e.g., stored in storage server cache 325. For one embodiment, the storage server 120 determines that the requested page is redundant or has been deduplicated and maps to three or more virtual addresses.

For one embodiment, virtual addresses are mapped to a unique identifier other than, or in addition to, a physical address. For example, a hash function may be applied to the page data (i.e., a fingerprint) and used as a unique identifier for the page. For one embodiment, the database of redundant/deduplicated data is organized as a hash table that is accessed using the unique identifier (physical address, fingerprint, etc.) as a hash key. Each unique identifier would map to a list of virtual addresses that all store a common page—either redundantly or via deduplication.

If the first virtual address does not map to a redundant/deduplicated page, at block 615, the storage server 120 transmits the requested page to the client 100. Otherwise, if the first virtual address does map to a redundant/deduplicated page, at block 620, the storage server 120 transmits the requested page to the client 100 along with metadata including the unique identifier for the requested page and two or more virtual addresses that map to the requested page. For one embodiment, client 1 stores the requested page—e.g., in its client cache 225.

In the corresponding example in FIG. 4, the storage server 120 transmits to client 1 the page at PBN 0 (illustrated by the shaded box containing 0) and metadata including PBN 0 and the corresponding VBN's that map to unique identifier PBN 0 (illustrated as 0→f1:0, f2:0). For one embodiment, the metadata only includes virtual addresses for files associated with the client that sent the I/O request. For example, files 1 and 2 are associated with client 1, so client 1's I/O request for f1:0 would result in the return of metadata such as 0→f1:0, f2:0 if the storage server 120 only returned pages of files if they are associated with client 1. Alternatively, in a system that requires less security/privacy between files associated with each client, the metadata includes virtual addresses for files associated with all clients 100, regardless of which client sent the I/O request.

For one embodiment, client 1 stores the unique identifier and corresponding virtual address(es)—e.g., in the client cache 225. Should client 1 have a second I/O request for another virtual address that maps to PBN 0, e.g., f2:0, client 1 utilizes the metadata in the client cache 225 to recognize that f2:0 refers to a redundant/deduplicated page received as a result of the first I/O request for f1:0. As a result, the I/O request for f2:0 is not sent to the storage server 120, which conserves bandwidth between client 1 and the storage server 120. Additionally, for one embodiment, client 1 avoids caching a duplicate copy of the deduplicated page at PBN 0.

As illustrated in FIG. 4, client 1 and the storage server 120 do not verify that the second I/O request is still valid and method 600 ends at block 645. For one embodiment, the pages within the client 1 and storage sever 120 system are subject to an exclusive lock to compensate for the lack of a verification check. Alternatively, client 1 and the storage server 120 operate with no shared access or a loose consistency model.

Figure 5:
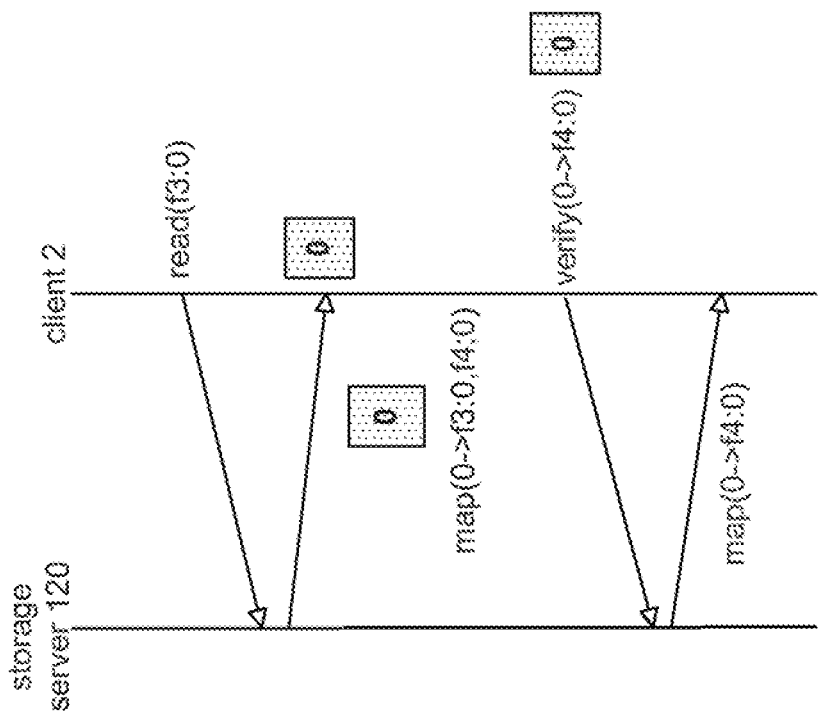
FIG. 5 shows an alternative exemplary exchange between a client and a storage server implementing I/O bandwidth reduction using storage-level common page information.
Figure 5:
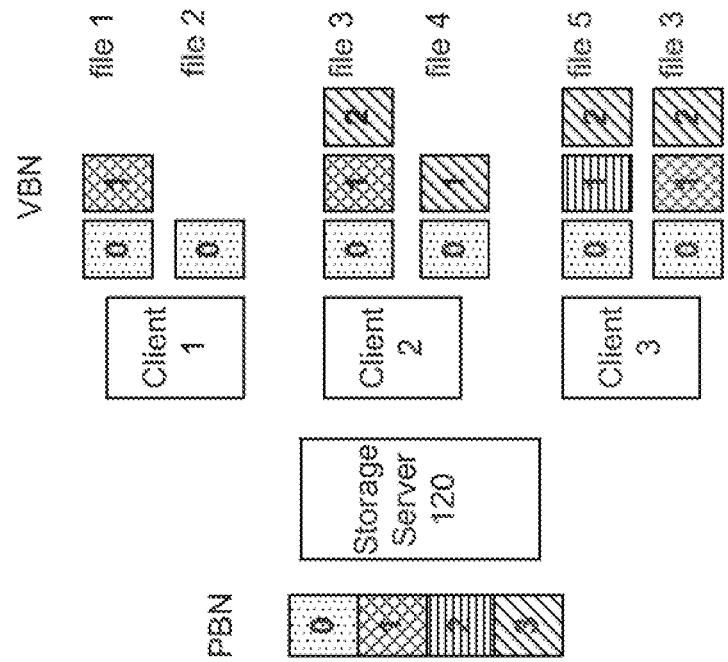

FIG. 5 shows an exemplary exchange between client 2 and a storage server 120 implementing an embodiment of I/O bandwidth reduction using storage-level common page information including verification that the cached metadata is still accurate. As a result, the storage system described with reference to client 2 may have shared access of pages with greater consistency. For example, if client 2 needs a page at a second virtual address, it checks its cache 225 and determines that the second virtual address maps to a page previously received (a cache hit), and requests verification that the mapping is still accurate before using the previously received page.

In the interest of maintaining a simple example, FIG. 5 includes the same mapping of virtual addresses used in FIG. 4. Given that the verification is added to an exchange similar to that described above with reference to FIG. 4, FIG. 5 will be explained with further reference to FIG. 6.

At block 625, the storage server 120 receives a verification request from a client 100 to verify that the second virtual address still maps to the redundant/deduplicated page. For example, in FIG. 5, client 2 transmits an I/O request and receives a page and corresponding metadata in a manner similar to client 1 described above. Client 2 sends an I/O request for a first virtual address, f3:0, and receives the requested page (stored at PBN 0) and metadata including a unique identifier, PBN 0, and corresponding VBN's f1:0, f2:0, f3:0, f4:0, and f50. Should client 2 have an I/O request for a second virtual address, e.g., for f4:0, client 2 recognizes that it is storing a page that was previously mapped to f4:0 and transmits a verification request for the second virtual address to the storage server 120 (illustrated as 0→f4:0) rather than the I/O request itself. For one embodiment, client 2 recognizes it is storing a page that was previously mapped to f4:0 by accessing the metadata previously received in response to the I/O request for f3:0. For one embodiment, client 2 stores and accesses the metadata in its cache 225 and the previously received metadata leads to a cache hit. For one embodiment, the verification request includes a VBN and a unique identifier for the page, such as a PBN, fingerprint, or another unique identifier.

At block 630, the storage server 120 determines if the second virtual address still maps to the redundant/deduplicated page. If the flapping is still valid, at block 635, the storage server 120 transmits metadata indicating its validity. For example, in FIG. 5, client 2 sends a verification request to storage server 120 including the metadata mapping 0→f4:0 and the storage server 120 responds with a metadata verification, e.g., by repeating back 0→f4:0, the corresponding metadata mapping for the UID, a Boolean value, or another affirmative response. If a fingerprint is used as the unique identifier, the storage server 120 determines if the content of the page is the same, rather than determining if the second virtual address still maps to the same physical address. The metadata verification consumes less bandwidth than sending (or resending) the page and, as a result, results in a reduction in I/O.

If the mapping is no longer valid, at block 640, the storage server 120 treats the verification request as an I/O request and transmits the new page of data that maps to the second virtual address or new metadata mapping the second virtual address to one or more new virtual addresses (e.g., a third virtual address). For one embodiment, the storage server 120 also determines if the new page at the second virtual address (e.g., f4:0) is a redundant/deduplicated page that maps to at least a third virtual address in a manner similar to blocks 610 and 620 above. If the new page is redundant/has been deduplicated, the storage server 120, in addition to transmitting the new page, transmits the corresponding redundancy/deduplication metadata (e.g., corresponding virtual addresses). For one embodiment, if the new page is redundant/has been deduplicated and was previously sent to the client 100, the storage server 120 may optionally predict if the client 100 is still caching a copy of the deduplicated page (as described below with reference to FIG. 8) and only send the metadata.

Figure 7:
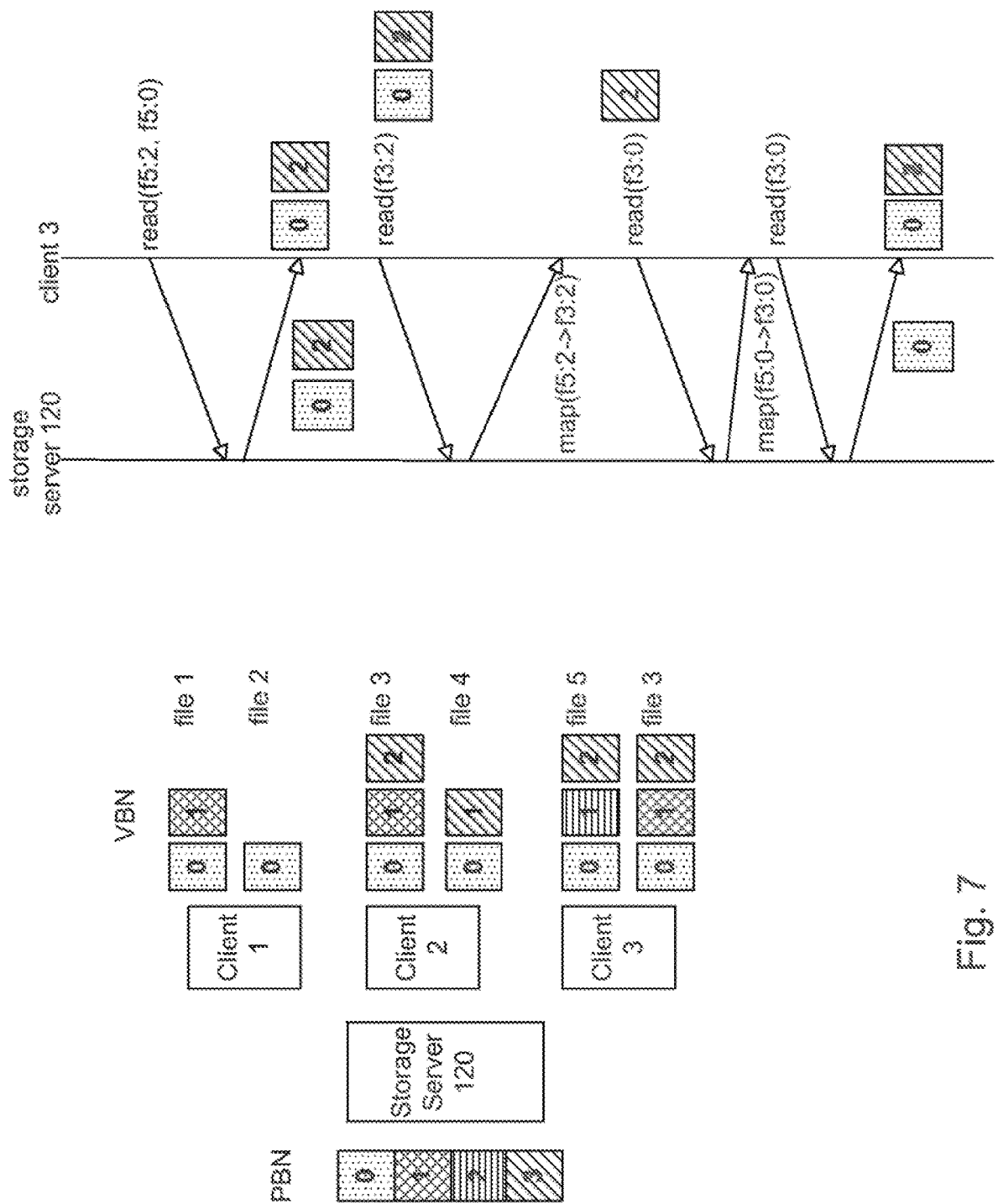
FIG. 7 shows another alternative exemplary exchange between a client and a storage server implementing I/O bandwidth reduction using storage-level common page information.

FIG. 7 shows an exemplary exchange between client 3 and a storage server 120 implementing an embodiment of I/O bandwidth reduction using storage-level common page information. In contrast to the examples of clients 1 and 2, client 3 does not cache redundancy/deduplication metadata. In the interest of maintaining a simple example, FIG. 5 includes the same mapping of virtual addresses used in FIG. 4. FIG. 7 will be explained with reference to FIG. 8.

Figure 8:
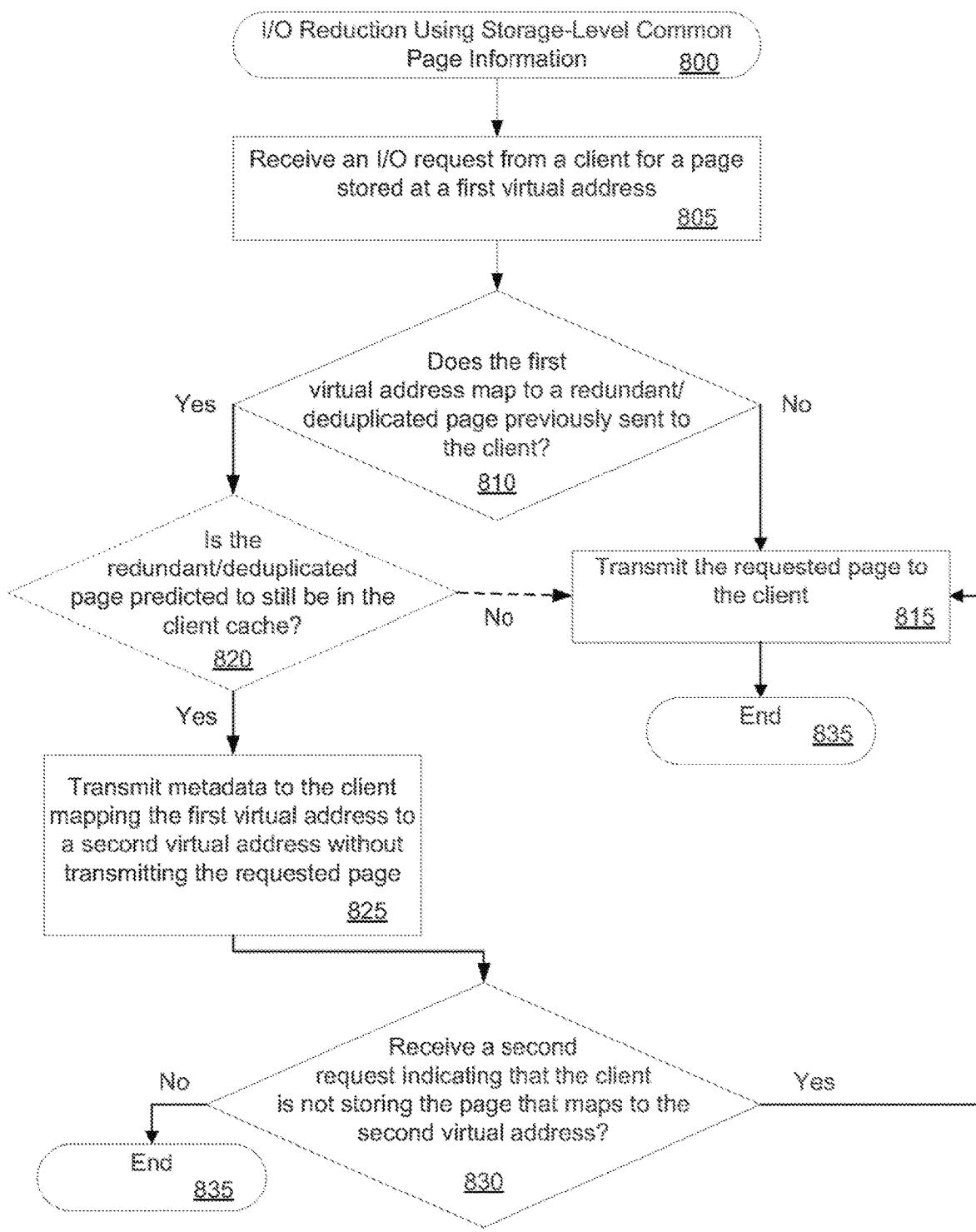
FIG. 8 shows an exemplary flow chart for an alternate method of I/O bandwidth reduction using storage-level common page information.

FIG. 8 shows an exemplary flow chart for an alternate method 800 of I/O bandwidth reduction using storage-level common page information. At block 805, the storage server 120 receives an I/O request from a client 100 for a page stored at a first virtual address. At block 810, the storage server 120 determines if the requested page at the first virtual address is a redundant/deduplicated page that also maps to a second virtual address that was previously sent to the client 100 (i.e., both the first and second virtual addresses map to a page via the same unique identifier). For one embodiment, the storage server 120 maintains a list, look up table, or other data structure mapping virtual addresses to redundant/deduplicated data (e.g., via unique identifiers) and pages that have been previously transmitted to each client 100. For one embodiment, this data structure is stored within storage server cache 325). If the page is not redundant/deduplicated or has not previously been sent to the client 100, at block 815, the storage server 120 transmits the requested page to the client 100.

For example, referring to FIG. 7, client 3 transmits an I/O request to the storage server 120 for virtual addresses f5:2 and f5:0. The storage server 120 deter nines that the pages have not been previously transmitted to client 3 and responds by transmitting the pages stored at PBN's 0 and 3 to client 3. Client 3 subsequently transmits an I/O request to the storage server 120 for another virtual address, f3:2. The storage server 120 determines that f3:2 maps to a deduplicated page that was recently transmitted to client 3—f3:2 and f5:2 map to unique identifier PBN 3.

If the requested page is redundant/has been deduplicated, and the requested page was previously sent to the client 100, the storage server 120 may optionally, at block 820, predict if the client 100 is still caching a copy of the redundant/deduplicated page. For one embodiment, if the storage server 120 determines that the redundant/deduplicated page was previously sent to the client 100 but the page is predicted to have been evicted, the storage server 120 will transmit, at block 815, the requested page (rather than metadata mapping the request to a page that is probably no longer in the client cache).

For one embodiment, the storage server 120 emulates a page replacement policy based on I/O requests received from the client 100 to predict what pages are stored in the client cache 225. For example, the storage server 120 maintains a recently accessed page list for each client 100 (e.g., in storage server cache 325). The recently accessed page list prioritizes page accesses from most recently used to least recently used (e.g., at either end of the list). When an I/O request is received for a page, or the page is otherwise accessed (e.g., updated access time), the storage server 120 moves the page to or towards a most recently used end of the list for that client 100. The storage server 120 can determine, based on a known or guessed client cache size and the recently accessed pages, which pages are predicted to be stored in the client cache 225. For example, a number of pages (based on the client cache size) at the most recently used end of the list are predicted to be in the client cache 225 while the pages at the least recently used end of the list are predicted to have been evicted. Alternatively, the storage server 120 may use a predetermined length of time as an indication of the likelihood that the requested page is predicted to still be stored within the client cache 225. For example, the storage server 120 may remove a page from the recently accessed page list after an expiration of an amount of time.

If the requested page is predicted to still be in the client cache 225, or if the storage server 120 does not implement such a prediction (i.e., skipping block 820), at block 825, the storage server 120 transmits metadata to the client 100 mapping the first virtual address to the second virtual address. Continuing the example in FIG. 7, the storage server 120 transmits f5:2→f3:2 to client 3 to indicate that the second I/O request for f3:2 maps to a redundant/deduplicated page that was previously sent to client 3 (f5:2). Some bandwidth is used for the storage server 120 to respond to a second I/O request. The amount of bandwidth, however, is less than would be used if the page itself was sent rather than the metadata. Client 3, in receipt of the metadata mapping f5:2 to f3:2, uses the cached copy of the requested page (at PBN 3).

If the prediction that a page is stored in the client cache 225 is wrong (i.e., an attempt to access a page in the cache using the metadata sent by the storage server 120 results in a cache miss), or if such a prediction is not used, a client 100 alerts the storage server 120 when the client 100 is no longer caching the previously transmitted page. If the storage server 120 receives, at block 830, an indication that the client 100 is no longer storing the page that maps to the second virtual address (e.g., it has been evicted from the client cache 225), the storage server 120 transmits, at block 815, the requested page (f3:0) to the client 100.

Continuing with the example in FIG. 7, client 3 transmits a request to the storage sever 120 for virtual address f3:0. The storage server 120 transmits f5:0→f3:0 to client 3 to indicate that the second I/O request (first I/O request directly for f3:0) maps to redundant/deduplicated data that was previously sent to client 3 (f5:0). At this point, however, client 3 has evicted the page that maps to f5:0 from the client cache 225 (client 3 is illustrated as only storing the shaded box for f5:2). Upon receiving f5:0→f3:0, client 3 determines that f3:0 has been evicted from the client cache 225 and sends a corresponding message to the storage server 120. Upon receiving the message that client 3 is no longer caching f5:0 (e.g., second read request for f3:0), the storage server 120 transmits the page stored at f3:0 (PBN 0) to client 3.

Thus, I/O bandwidth reduction using storage-level common page information is implemented in a computer system as described herein. In practice, the methods 600 and 800 may constitute one or more programs made up of computer-executable instructions. The computer-executable instructions may be written in a computer programming language, e.g., software, or may be embodied in firmware logic or in hardware circuitry. The computer-executable instructions to implement a persistent cache may be stored on a machine-readable storage medium. A "computer-readable storage medium," or a "non-transitory computer-readable storage medium," as the terms are used herein, include any mechanism that provides (i.e., stores and/or transmits) information in a form accessible by a machine (e.g., a computer, network device, personal digital assistant (PDA), manufacturing tool, any device with a set of one or more processors, etc.). A "non-transitory computer-readable storage medium," as the term is used herein, does not include a signal, carrier wave, etc. The term RAM as used herein is intended to encompass all volatile storage media, such as dynamic random access memory (DRAM) and static RAM (SRAM). Computer-executable instructions can be stored on non-volatile storage devices, such as magnetic hard disk, an optical disk, and are typically written, by a direct memory access process, into RAM/memory during execution of software by a processor. One of skill in the art will immediately recognize that the terms "machine-readable storage medium" and "computer-readable storage medium" include any type of volatile or non-volatile storage device that is accessible by a processor. For example, a machine-readable storage medium includes recordable/non-recordable media (e.g., read-only memory (ROM); random access memory (RAM); magnetic disk storage media; optical storage media; flash memory devices; etc.).

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

Therefore, it is manifestly intended that this invention be limited only by the following claims and equivalents thereof.

What is claimed is:

1. A method performed by a first computing device, comprising:
  receiving a request from a second computing device for a first data block via a first address;
  determining that the first data block is a duplicate of a second data block stored at a second address based upon a determination that a data structure maps the first address and the second address to same deduplicated data, wherein the data structure is populated by a deduplication algorithm to map addresses to deduplicated data; and
  transmitting a response to the second computing device to indicate that the first address is mapped to the second address, wherein the response indicates to the second computing device that the second computing device has local access to the second data block using the second address.

2. The method of claim 1, comprising:
  determining that the first data block is locally stored by the first computing device at the first address.

3. The method of claim 1, comprising:
  determining that the second data block is locally stored by the second computing device as the duplicate of the first data block.

4. The method of claim 1, comprising:
  determining that the second data block is stored within a cache associated with the second computing device based upon the first address and the second address corresponding to duplicate data blocks.

5. The method of claim 1, wherein the deduplication algorithm populates the data structure with entries mapping addresses to data blocks deduplicated by the deduplication algorithm, wherein the request is determined to be redundant based upon the request mapping to multiple addresses within the data structure.

6. The method of claim 1, comprising:
  performing a prediction that the first data block is stored within a cache associated with the second computing device as the second data block.

7. The method of claim 1, comprising:
  transmitting the first data block to the second computing device based upon a prediction that the first data block is no longer stored as the second data block in a cache associated with the second computing device.

8. The method of claim 1, comprising:
  transmitting the first data block to the second computing device based upon a prediction that the first data block is no longer stored as the second data block by the second computing device.

9. The method of claim 1, comprising:
  determining that the first address and the second address map to duplicate data blocks based upon the first address and the second address mapping to a same unique identifier.

10. A non-transitory machine readable medium comprising instructions for performing a method, which when executed by a first computing device, causes the first computing device to:
  receive a request from a second computing device for a first data block via a first address;
  determine that the first data block is a duplicate of a second data block stored at a second address based upon a determination that a data structure maps the first address and the second address to same deduplicated data, wherein the data structure is populated by a deduplication algorithm to map addresses to deduplicated data; and
  transmit a response to the second computing device to indicate that the first address is mapped to the second address, wherein the response indicates to the second computing device that the second computing device has local access to the second data block using the second address.

11. The non-transitory machine readable medium of claim 10, wherein the instructions cause the first computing device to:
  determine that the first data block is locally stored by the first computing device at the first address.

12. The non-transitory machine readable medium of claim 10, wherein the instructions cause the first computing device to:
  determine that the second data block is locally stored by the second computing device as the duplicate of the first data block.

13. The non-transitory machine readable medium of claim 10, wherein the instructions cause the first computing device to:
  determine that the second data block is stored within a cache associated with the second computing device.

14. The non-transitory machine readable medium of claim 10, wherein the data structure maps addresses to data blocks.

15. A computing device comprising:
  a memory comprising machine executable code; and
  a processor coupled to the memory, the processor configured to execute the machine executable code to cause the processor to:
    receive a request from a second computing device for a first data block via a first address;
    determine that the first data block is a duplicate of a second data block stored at a second address based upon a determination that a data structure maps the first address and the second address to same deduplicated data, wherein the data structure is populated by a deduplication algorithm to map addresses to deduplicated data; and
    transmit a response to the second computing device to indicate that the first address is mapped to the second address, wherein the response indicates to the second computing device that the second computing device has local access to the second data block using the second address.

16. The computing device of claim 15, wherein the machine executable code causes the processor to:
  determine that the second data block is locally stored by the second computing device as the duplicate of the first data block.

17. The computing device of claim 15, wherein the machine executable code causes the processor to:
    perform a prediction that the first data block is stored within a cache associated with the second computing device as the second data block.

18. The computing device of claim 15, wherein the machine executable code causes the processor to:
    transmit the first data block to the second computing device based upon a prediction that the first data block is no longer stored as the second data block in a cache associated with the second computing device.

19. The computing device of claim 15, wherein the machine executable code causes the processor to:
    transmit the first data block to the second computing device based upon a prediction that the first data block is no longer stored as the second data block by the second computing device.

20. The computing device of claim 15, wherein the response indicates that the first data block is an equivalent of the second data block.

\* \* \* \* \*